March 23, 1948. D. W. CARTER 2,438,147
DIAMOND TOOL DRESSER
Filed Oct. 18, 1945
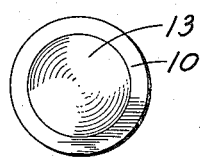
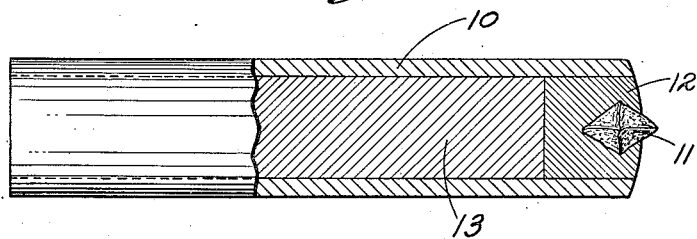
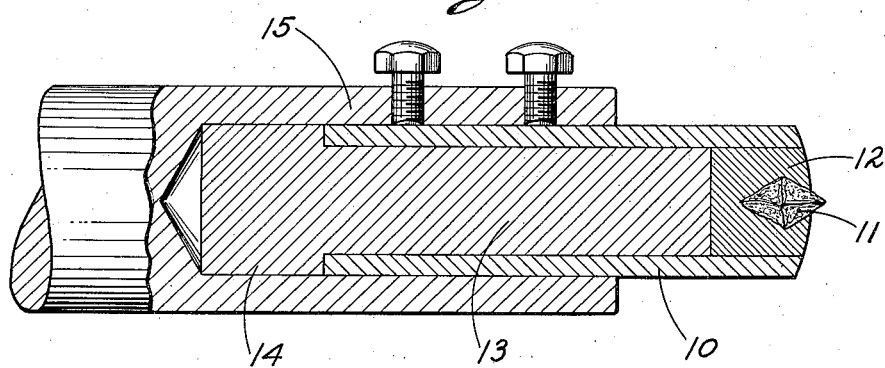
INVENTOR.
DONALD WOOD CARTER
BY
ATTORNEYS Patented Mar. 23, 1948

2,438,147

UNITED STATES PATENT OFFICE 2,438,147

DIAMOND TOOL DRESSER

Donald Wood Carter, Cleveland Heights, Ohio

Application October 18, 1945, Serial No. 623,004

8 Claims. (Cl. 125—39)

This invention relates broadly to diamond tool dressers and more specifically to improvements in the construction of holders therefor.

One of the objects of the invention is to provide a holder which will effect the dissipation of heat generated during the dressing operation of a grinding wheel and thus preserve the stability and life of the diamond.

Another object of the invention is to form a holder from a material of high thermal conductivity and to encase such material in a shell of sufficient strength, ductility and hardness to provide a rigid support for the tool and also withstand the deleterious effects of the set screws or other clamping media customarily employed for the support of the holder.

Further objects of the invention reside in the provision of a holder which is efficacious of heat conducitivity, durable of structure, economic of manufacture and similar in size and form to other tool dressers heretofore constructed.

Other objects and advantages more or less ancillary to the foregoing and the manner in which all the various objects are realized will appear in the following description, which considered in connection with the accompanying drawings, sets forth the preferred embodiment of the invention.

Referring to the drawings:

Fig. 1 is a longitudinal sectional view through a tool dresser embodying the present invention;

Fig. 2 is an end elevational view thereof; and

Fig. 3 is a longitudinal sectional view through a modified form of the tool dresser illustrated in Fig. 1 including a fragmentary portion of a supporting member therefor.

Referring first to Fig. 1 the improved diamond holder comprises a relatively thin shell 10 of steel or other material of sufficient strength to provide the requisite rigidity for the diamond supporting medium. The diamond 11 is embedded in the conventional manner in either a highly compressed comminuted metal substance, a cast metal alloy 12 supported in the outer end of the shell 10 or in any other manner. The mounting material 12 is formed for intimate engagement with the end portion of a plug or core 13 formed of copper or some other metal having similar heat conductivity characteristics. The core 13 is likewise compressively engaged with the shell 10 and formed with an end portion thereof flush with the inner end of the shell.

As shown in the modified form illustrated in Fig. 3 the core 13 is formed with an enlarged head 14 adapted for contact with the inner surface of a tool supporting member 15 typical of one of the supports employed in tool dressers of this character. The steel shell is provided to facilitate the rigid support of the outboard portion of the diamond holder and to also resist mutilation of the circumferential wall of the holder consequent the use of set screws or similar clamping mechanism having sharp or edged bearing faces. The core 13 is formed for a press fit engagement within the shell 10 so that the transfer of heat may be readily effected between the two bodies constituting the assembly. The enlarged head 14 of the core 13 is likewise formed for snug engagement within the supporting member 15 to further the thermal heat conductivity of the holder.

In operation it has been found that the heat generated by the frictional resistance of the diamond with an abrasive wheel will be readily conducted through the diamond mounting, core 13 and through the thin steel shell 10 where in turn it will be dissipated through the supporting bar or anchorage member therefor. In practice it has been found that a tool holder of this character resists deterioration of the diamond and thus prolongs the life of the tool far beyond that of similar holders in which no provision has been made for the transfer of heat from the diamond to the supporting structure.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A tool dresser comprising a steel tube formed with a relatively thin wall, a diamond mounting material in an end thereof disposed in intimate engagement with the inner surface of the tube, a diamond in said mounting material and a core formed of a material having high thermal conductivity disposed throughout the remaining length of said tube and engaged in intimate contact with the mounting material and inner surface of the tube.

2. A tool dresser comprising a thin walled steel shell, a diamond mounting material compressively retained in one end thereof, a diamond embedded in said mounting material and a copper core compressively retained within said shell and disposed in intimate engagement with said mounting material.

3. A diamond tool dresser comprising a thin walled steel tube, a diamond mounting material in an end portion thereof, a diamond therein and a plug formed of a metal having high thermal conductivity frictionally engaged with the inner surface of the tube rearward of the mounting material and in intimate engagement with the mounting material.

4. A diamond tool dresser comprising a steel tube, a diamond mounting material in one end thereof, a diamond therein, a copper core in said tube engaged with said mounting material, and an enlarged head on said core protruding beyond the end of said tube and of a diameter equal thereto.

5. A diamond tool dresser comprising a steel shell, a diamond mounting material in one end thereof, a diamond embedded therein, and a copper core in said shell disposed in abutting engagement with the mounting material and protruding beyond the opposed end of said tube.

6. A tool dresser for abrasive wheels comprising a copper bar, a diamond mounting material disposed in abutting engagement therewith, a diamond therein, and a steel shell encasing said bar and said mounting material, the walls of said shell being formed to restrain lateral deflection of said bar.

7. A tool dresser comprising a steel shell open at both ends, a plug retained in one end of the shell, a diamond embedded in the plug, and a core of metal of high heat conductivity substantially filling the remainder of the shell and intimately engaging the plug and shell.

8. A tool dresser comprising a steel shell open at both ends, a plug retained in one end of the shell, a diamond embedded in the plug, and a core of metal of high heat conductivity filling the remainder of the shell and intimately engaging the plug and shell, said core extending beyond the end of the shell and having the portion without the shell of the same diameter as the shell.

DONALD WOOD CARTER.

REFERENCES CITED

The following references are of record in the file of this patent:

UNITED STATES PATENTS

| Number | Name | Date |
| --- | --- | --- |
| 1,191,746 | Thomson | July 18, 1916 |
| 1,926,330 | Cotton | Sept. 12, 1933 |
| 2,351,741 | Booth | June 20, 1944 |